United States Patent [19]

Dershowitz

[11] Patent Number: 4,672,657

[45] Date of Patent: Jun. 9, 1987

[54] MULTICHANNEL TELEPHONE SYSTEM

[75] Inventor: Kenneth L. Dershowitz, Austin, Tex.

[73] Assignee: Motorola, Inc., Schaumburg, Ill.

[21] Appl. No.: 810,004

[22] Filed: Dec. 17, 1985

[51] Int. Cl.⁴ ............................................... H04Q 7/04
[52] U.S. Cl. ........................................ 379/63; 379/58; 455/34
[58] Field of Search .................. 179/2 E, 2 EA, 2 EB

[56] References Cited

U.S. PATENT DOCUMENTS

| | | | |
|---|---|---|---|
| 3,173,996 | 4/1965 | Rypinski, Jr. ........................ | 179/41 |
| 3,806,663 | 4/1974 | Peek et al. ............................ | 179/41 |
| 3,806,804 | 4/1974 | Mills et al. ............................ | 325/55 |
| 3,898,390 | 8/1975 | Wells et al. .......................... | 179/41 |
| 3,912,875 | 10/1975 | Katz ...................................... | 179/41 |
| 4,028,500 | 6/1977 | McClure et al. ...................... | 179/41 |
| 4,129,749 | 12/1978 | Goldman ........................... | 179/2 EB |
| 4,130,731 | 12/1978 | Bolgiano et al. .................. | 179/2 EB |
| 4,155,040 | 5/1979 | Harmon et al. ....................... | 325/25 |
| 4,163,121 | 7/1979 | Yeshikawa et al. .............. | 179/2 EB |
| 4,242,538 | 12/1980 | Ito et al. ........................... | 179/2 EB |
| 4,281,413 | 7/1981 | Forrest .................................. | 455/34 |
| 4,409,687 | 10/1983 | Berti et al. ............................ | 455/7 |
| 4,456,793 | 6/1984 | Baker et al. ........................ | 179/99 R |
| 4,534,061 | 8/1985 | Ulug ...................................... | 455/17 |
| 4,553,262 | 11/1985 | Coe ........................................ | 455/15 |
| 4,573,206 | 2/1986 | Grauer et al. ......................... | 455/33 |

Primary Examiner—Robert Lev
Attorney, Agent, or Firm—Steven G. Parmelee

[57] ABSTRACT

A multi-channel RF telephone system that utilizes a dedicated channel status monitor to develop a list of available communications channels, and a common channel transceiver to transmit this list to the telephones. The telephones select a channel to use from this list by sequentially accessing the list a number of times based upon, at least in part, an identification number uniquely assigned to the telephone in question. If the selected channel is in fact unavailable, the telephone can update the list it maintains independently.

43 Claims, 9 Drawing Figures

MULTICHANNEL TELEPHONE SYSTEM

TECHNICAL FIELD

This invention relates generally to RF communications systems, and particularly to systems having a number of available communications channels that typically equals or exceeds the number of communications stations, as often occurs in a multichannel telephone system.

BACKGROUND ART

Multichannel telephone systems are found in many office and business settings. Such systems typically include a number of remotely located telephones that communicate through a key service unit with a primary communications link, such as external telephone lines or the like. In general, these individual telephones communicate with the key service unit through an electrical conductor such as copper wire.

These hard wired systems have certain benefits. For instance, the communications channels are not readily subject to interference or nonavailability due to interaction or proximity with other telephones. Further, by using solid conductors, many multichannel telephone systems can operate in close proximity to one another without incurring an unacceptable risk of interference between the systems.

Nevertheless, hard wired multichannel telephone systems also have many inherent problems. The installation of conductor paths can be costly and time consuming, and typically represents a permanent, or at least semi-permanent, installation. When users of such a system are moved about, and to the extent that operation layouts change, modifying the conductor paths also requires a substantial expenditure of time and money.

One proposed solution suggests the use of RF user channels; i.e., the telephones and the key service unit would communicate with one another via radio communications instead of solid conductors. Many benefits would result through use of such a system. For instance, the telephones could be initially located and subsequently moved virtually at will, so long as the telephones remained located within the transmission and reception ranges of the equipment.

Unfortunately, there are also many problems associated with such a system. For example, by one possible approach, the key service unit can have one RF transceiver for each allocated RF user channel. If a particular system had, for example, thirty-one different frequencies approved for use in the system, then the key service unit would have to have thirty-one transceivers as well. This represents an expense that reduces the feasibility of favorably comparing an RF based system to a hard wired one.

Another problem involves annoying delays that can be experienced between the time a user lifts the telephone handset and the time a dial tone is attained. These delays can arise because a communications link is attempted on a user channel that is not currently available (due to use of that channel by another telephone or due to interference). Also, delays can result because many users try to initiate a communications link substantially simultaneously. When this happens, many different telephones may try to simultaneously access the key service unit through the same user channel, thereby delaying the time until dial tones can be provided to all of the telephones.

With reference to yet another problem, interference can arise when two or more multichannel telephone systems using RF links are positioned within range of one another. Such interference also leads to delay and inefficiency.

With reference to yet still another problem, prior art systems tend to allow either the key service unit or the remote telephones to decide exclusively which channel a communications link will be attempted on. This can lead to problems in a dispersed system where a given channel may appear available in one location and yet not be available in another location due to local interference. If, for instance, the key service unit exclusively makes all decisions regarding channel usage, then a channel it selects may in fact not be available to the telephone, even though it might appear available to the key service unit. This can lead to significant disruption of service.

There therefore exists a need for a multichannel telephone system that can minimize the expense of key service unit transceiver needs while simultaneously allowing RF links to be utilized, that can minimize delay time in obtaining a dial tone, and that can minimize problems associated with adjacent systems.

SUMMARY OF THE INVENTION

These needs and others are substantially met through provision of the multichannel telephone system described in this specification. In one embodiment of this invention, the system provides only as many key service unit transceivers as there are remote telephones. For example, if thirty-one communication channels are allocated to a particular system, but only 10 remote telephones are to be utilized, then the key service unit will be provided with only 10 communications transceivers. To accommodate this configuration, the transmission and reception frequency for each transceiver can be selectively altered by the key service unit such that each transceiver can communicate on any of the allocated communications channels on an as-assigned basis.

In addition, the invention provides one additional transceiver and a receiver. The receiver scans the user channels to collect data regarding channel availability. The key service unit then maintains a list identifying the available channels that can be used to establish communication links between the key service unit and the telephones. Pursuant to a strategy set forth below in more detail, the additional transceiver unit regularly transmits this channel status list to the telephones such that this list of apparently available channels can be utilized by the telephones. In one embodiment of this invention, the additional transceiver could be provided for through appropriate use of one of the key service unit transceivers, provided that certain precautions are observed as set forth below in more detail.

In another embodiment of this invention, the individual telephones are allowed to select which communications channel will be used to attempt a communications link. The selection will be made from the channel status list provided to the telephones by the key service unit.

To avoid the problems that result when two or more telephones attempt to establish a link substantially simultaneously, provisions are made whereby the initial frequency selected by each telephone will be substantially unique to that telephone and will not likely be simultaneously attempted by another telephone. To accomplish this, both a phone identification number and a key service unit identification number are used to select the initial (and subsequent) channel frequency.

For example, if thirty-one frequencies are available in a particular system, these channels can be stored in a ring like memory structure, and the telephone can select the initial frequency by counting around this list an amount equal to a number derived from the telephone identification number. All other things remaining equal, this lends some degree of assurance that each telephone will attempt initiation of a communications link on different communications channels, even when such links are attempted by many telephones substantially simultaneously.

To further aid in ensuring uniqueness of both the initial and subsequent attempts to establish a communications link, the direction in which the telephone counts around the above mentioned memory ring is made a function of both the key service unit identification number and the number of link attempts that have already been made without success. This introduces yet a further measure of planned randomness to assure that not only will telephones within a given system not compete unduly with one another, but telephones in competing systems will similarly avoid one another to an acceptable extent.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein.

BEST MODE FOR CARRYING OUT THE INVENTION

Figure 1:
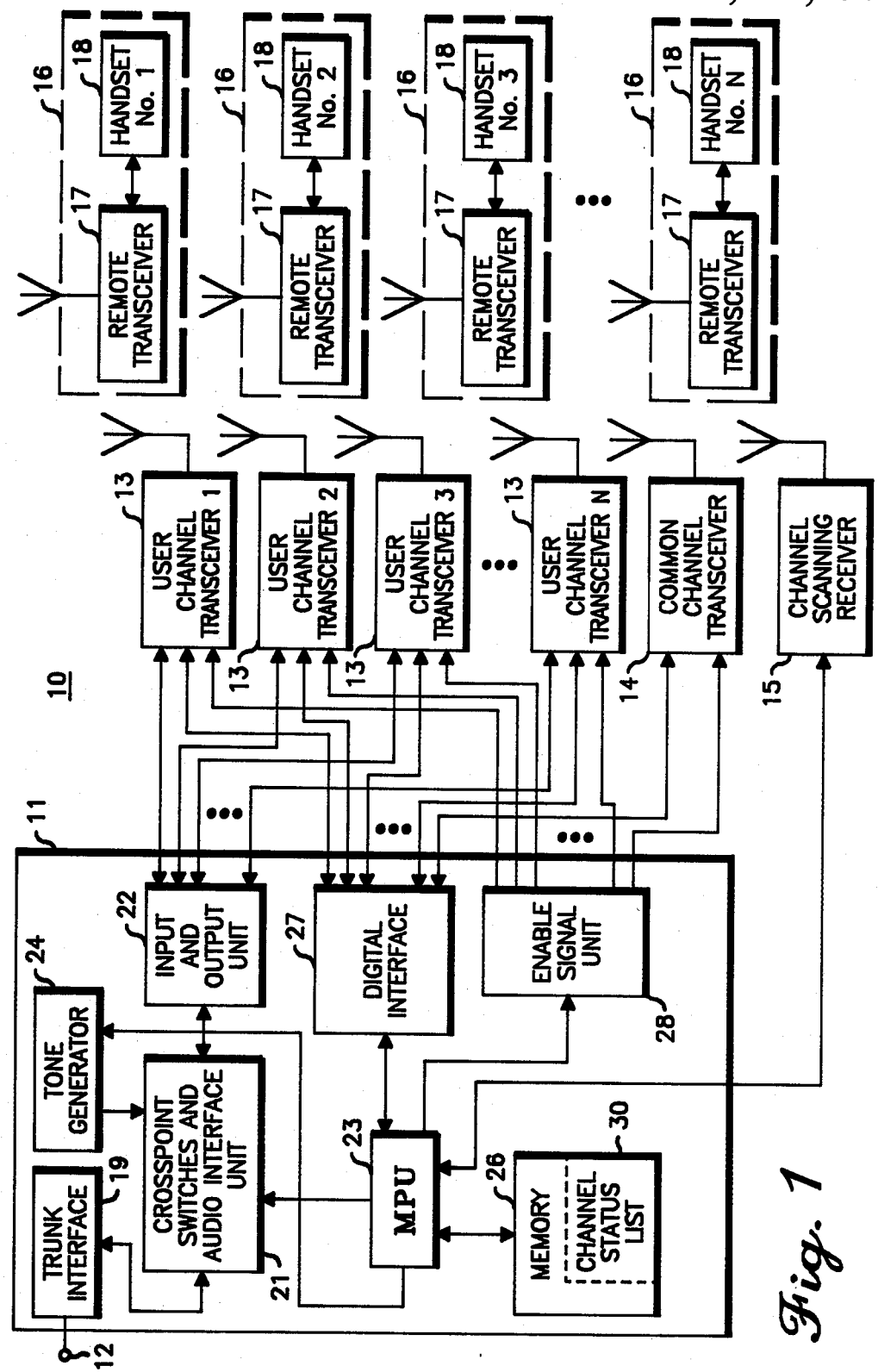
FIG. 1 comprises a block diagram depiction of the system.

Referring now to the drawings, and in particular to FIG. 1, the system can be seen as depicted generally by the numeral 10. The system (10) includes generally a key service unit (11) that connects between a primary communications link (12) and a plurality of user channel transceivers (13). The key service unit (11) also connects to a common channel transceiver (14) and a channel scanning receiver (15). The system (10) also includes a plurality of telephones (16), with each telephone (16) having a remote transceiver (17) and a handset (18). Each of the above generally referred to components will now be described in more detail in seriatim fashion.

With continued reference to FIG. 1, the key service unit (11) parallels in many respects prior art key service units. Therefore, many component parts of the key service unit (11) need not be described in detail.

The key service unit (11) connects to a primary communications link (12) (such as a telephone trunk line) through a trunk interface (19). A cross point switches and audio interface unit (21) serves as a switching unit to connect the various communications lines of the primary communications link (12) to the various audio channels serviced by the key service unit (11). For instance, the cross point switches and audio interface unit (21) can exchange audio information with the various user channel transceivers (13) through an input and output unit (22), as well understood in the art.

The key service unit (11) also includes a microprocessor (23) to control operation of the cross point switches and audio interface unit (21) and other components of the key service unit (11), such as a tone generator (24). This microprocessor (23) also serves to perform other functions relevant to the invention that will be described in more detail below.

A memory (26) connects to the microprocessor (23) to provide storage for programs and data such as a channel status list (30), the latter being explained in more detail below. The microprocessor (23) also connects through a digital interface (27) to the various user channel transceivers (13) and the common channel transceiver (14) to allow digitized information to be transmitted through those transceivers as appropriate.

Finally, the key service unit (11) includes an enable signal unit (28) that responds to the microprocessor (23) by providing an enable signal to the various transceivers (13 and 14) associated with the key service unit (11) for purposes described below.

The channel scanning receiver (15) can be comprised of any of a number of prior art mechanisms that serve to selectively scan a series of preselected frequencies and provide an output signal whenever energy can be sensed on one of the scanned frequencies.

Figure 2:
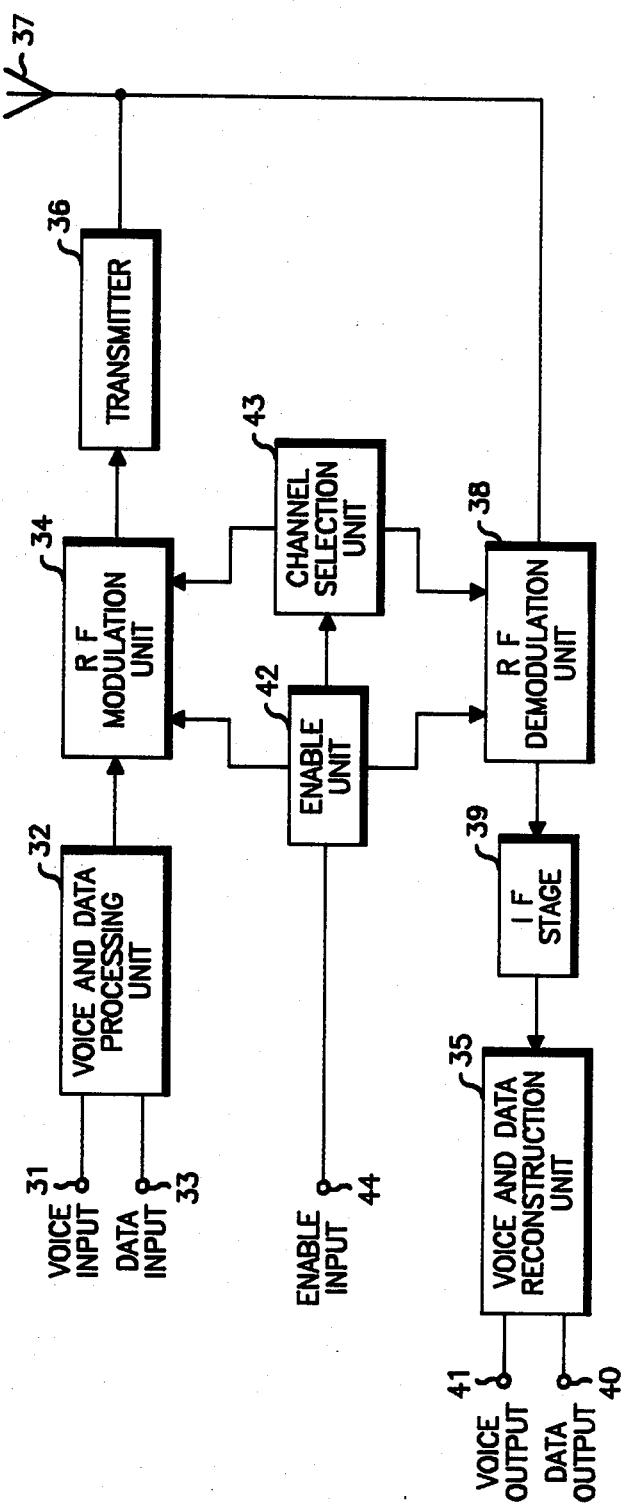
FIG. 2 comprises a block diagram depiction of a user channel transceiver.

Referring now to FIG. 2, a user channel transceiver (13) will be described (since the user channel transceivers (13) are identical to one another, only one will be described in detail).

Voice information from the input and output unit (22) of the key service unit (11) can be received at a voice input port (31) of a voice and data processing unit (32). Similarly, data as received through the digital interface (27) of the key service unit (11) can be received at a data input port (33) of the voice and data processing unit (32). Many voice and data processing systems are well known in the art, and hence no further description of the voice and data processing unit (32) need be provided here. It will be noted, however, that a voice and data processing unit particularly applicable for use with the disclosed system is described in U.S. patent application Ser. No. 797,736 as filed on Nov. 14, 1985 for a Simultaneous Voice and Data Transmission System (the latter application being owned by a common assignee and being incorporated herein by this reference).

The output of the voice and data processing unit (32) connects to the input of an RF modulation unit (34). In the RF modulation unit (34), the voice and data signals are modulated in any appropriate manner with a carrier signal having a preselected frequency. A transmitter (36) then amplifies and transmits this signal through an antenna (37), all as well understood in the art.

Signals transmitted by the telephones (16) are also received by the antenna (37) and are then demodulated in accordance with well understood prior art techniques in an RF demodulation unit (38). The resultant information signals are processed through an IF stage (39) and a voice and data reconstruction unit (35) to yield voice information at a voice output port (41) that can be connected to the input and output unit (22) of the key service unit (11), and data at a data output port (40) that can connect to the digital interface (27) of the key service unit (11), all as well understood in the art. (A voice and data reconstruction unit having particular applicability for use with the disclosed system is also described in the above referred to Simultaneous Voice and Data Transmission System patent application.)

Each user channel transceiver (13) also includes an enable unit (42) and a channel selection unit (43). The enable unit (42) receives enable signals from the enable signal unit (28) described above through an enable input port (44). Upon processing the enabling signals, the RF modulation unit (34) and the RF demodulation unit (38) can be enabled to process signals as described above, and in addition, the channel selection unit (43) can provide signals having an appropriate frequency to the RF modulation unit (34) and the RF demodulation unit (38) to dictate transmission and reception on a particular assigned communications channel frequency. (To accomplish this, the channel selection unit (43) could be provided, for instance, by a phase lock loop device wherein the output frequency can be altered by variation of the signal provided by the enable unit (42)).

It should be noted here that the enable unit (42) does not constitute an absolute prerequisite to an operable system. Provision of such a unit, however, tends to enhance reliability and assure accurate processing of legitimate signals by the system (10).

The common channel transceiver (14) can include the same structure as described above for the user channel transceiver (13), though the common channel transceiver (14) has no need for the capability of transmitting voice information. Therefore, the voice processing features could be discarded without detriment to performance if so desired. Nevertheless, if desired, the common channel transceiver function could be provided through use of one of the user channel transceivers, subject to occasionally reassignments of the common channel function from transceiver to transceiver. If using this configuration, however, care must be taken to ensure that one transceiver will always be performing the common channel function so long as even one telephone remains unconnected to the key service unit. This becomes particularly critical if the number of telephones (16) exceeds the number of available user channels. Regardless of how the common channel transceiver function is satisfied, the common channel transceiver will almost always need to be engaged in transmission activities, except perhaps at those times when every telephone in the system is communicating with the key service unit (11) over the user channels. Therefore, care should be exercised when selecting the transceiver vehicle to not unduly compromise this need.

Figure 3:
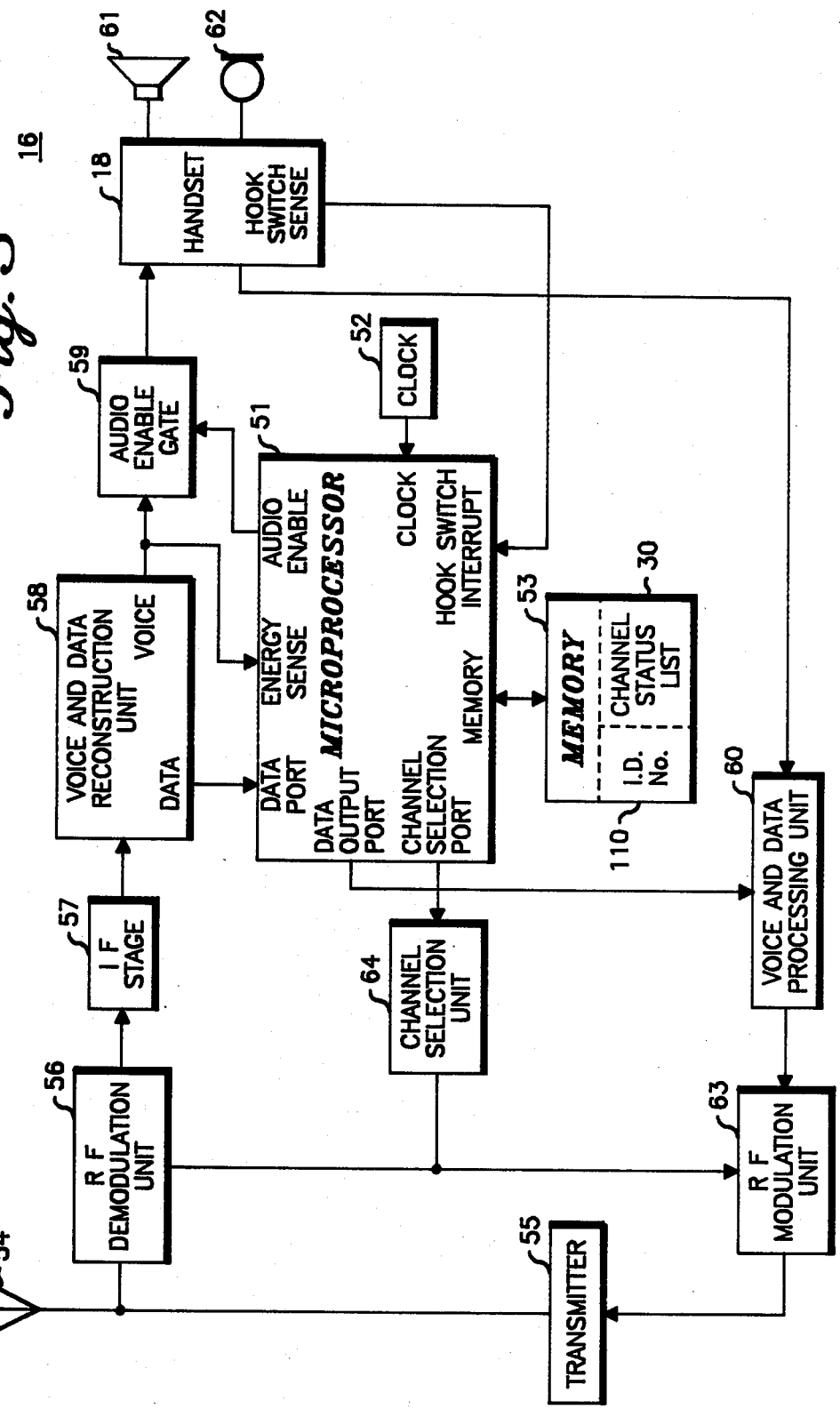
FIG. 3 comprises a block diagram depiction of a telephone.

Referring now to FIG. 3, a telephone (16) suitable for use with this system (10) will be generally described.

A microprocessor (51) can be provided to perform various functions as described below in more detail. The microprocessor (51) includes a clock port for receiving clock signals from a clock (52) and memory ports for communicating with a memory (53), both as well understood in the art. Other connections between the microprocessor (51) and the remaining structure of the telephone (16) will be described below as necessary.

An antenna (54) connects to the input of an RF demodulation unit (56) and to the output of a transmitter (55). In tandem, the RF demodulation unit (56) and an IF stage (57) receive signals as transmitted by a user channel transceiver (13) or the common channel transceiver (14) and extract therefrom a signal that can be provided to the input of a voice and data reconstruction unit (58), of which many are known in the art. (One voice and data reconstruction unit having particular applicability in the present application is described in the Simultaneous Voice and Data Transmission System patent application referred to above.) The data output port of the voice and data reconstruction unit (58) connects to a data port of the microprocessor (51). The voice output port of the voice and data reconstruction unit (58) connects to both an energy sense port of the microprocessor (51) and to an audio enable gate (59).

The audio enable gate (59) essentially comprises a controllable buffer, with the control signal being provided from an audio enable port of the microprocessor (51). In the presence of the audio enable signal, the audio enable gate (59) will transfer the voice information to the handset (18).

The handset (18), in accordance with well understood prior art structure, includes a speaker (61) and a microphone (62) to allow a user to input and receive verbal information. In addition, the handset (18) includes a hook switch sensing port that provides a hook switch sensing signal to a hook switch interrupt port of the microprocessor (51). Such hook switch sensing devices are well known in the art, and essentially serve to provide a signal whenever the handset has been rendered operable by a user.

The output of the handset (18) connects to a voice and data processing unit (60) identical to the one mentioned above with respect to the user channel transceivers (13), and to an RF modulation unit (63) and transmitter (55) identified above, to allow voice and data information to be transmitted as modulated with a carrier frequency having a preselected value.

The transmission frequency (i.e., the channel of transmission) can be controlled by the microprocessor (51) through connection to a channel selection unit (64) that controls the reception and transmission frequency of the RF demodulation unit (56) and the RF modulation unit (63), all in accordance with well understood prior art technique.

Figure 5A:
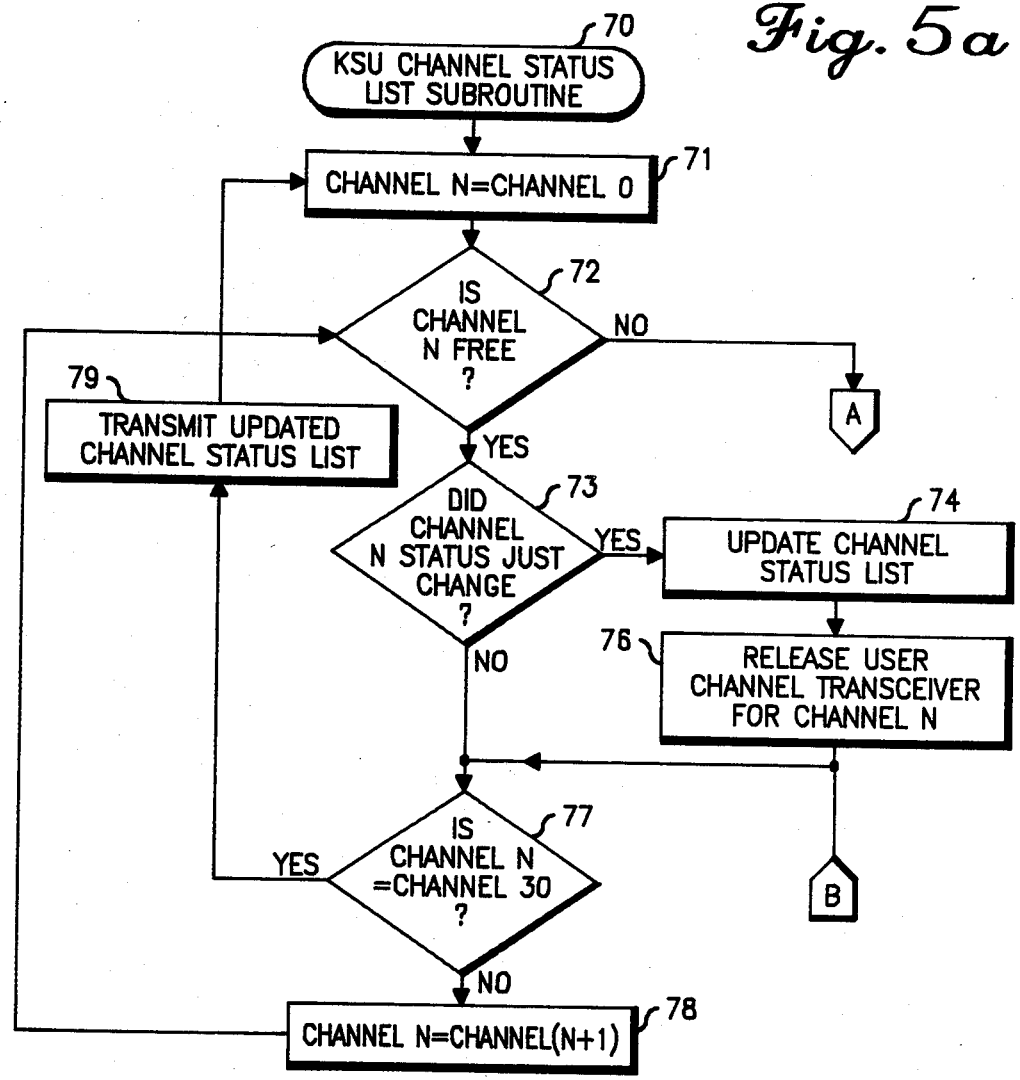
FIGS. 5a and 5b comprise a flow chart of the key service unit subroutine pertaining to creation of the channel status list.
Figure 5B:
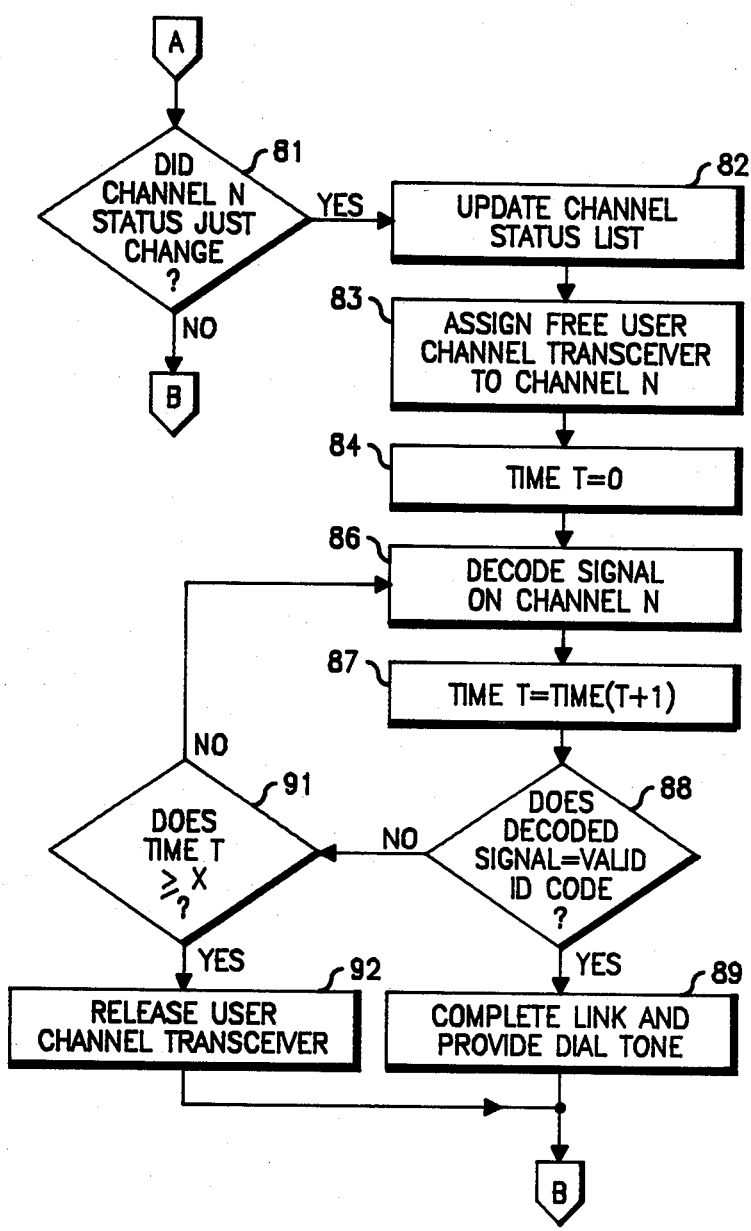

Referring now to FIGS. 5a and 5b, a KSU channel status list subroutine (70) suitable for use with the key service unit microprocessor (23) will be described. Pursuant to this subroutine (70), the key service unit (11) will operate the channel scanning receiver (15) to scan the various allocated communication channel frequencies to determine availability of these frequencies for service as communications links between the user channel transceivers (13) and the telephones (16). The subroutine (70) also allows construction and storage of a channel status list (30) as based upon the foregoing analysis.

To begin, a variable "Channel N" is initialized to zero, this assignment corresponding with the first channel to be scanned (71) (FIG. 5a). (For purposes of this example, it will be presumed that there are 31 frequencies available for use as a user channel, and these channels will be designated "channel 0" through "channel 30".) Following this, the microprocessor (23) determines (via the channel scanning receiver (15)) whether Channel N (in this case, channel 0 as established above)

currently exhibits energy (72). In the absence of energy, availability of the channel can be presumed. The opposite conclusion can be drawn in the presence of energy, which energy may be due either to legitimate transmission activity or interference.

In the absence of detected energy, the microprocessor (23) next compares this detected status with the channel status stored in the channel status list (30) to determine whether availability status of this channel has changed (73). If availability status has changed, the microprocessor (23) will update the channel status list (74) and release the user channel transceiver (13) that had been previously assigned to that channel, if any (76). (It may be noted here that the release function just mentioned could interfere with timely gathering of channel availability information, particularly if time delay safeguards were introduced into the function. Therefore, depending upon needs and available resources, the release function could be delegated to a subroutine to be treated as a separate process, or could even be transferred to another microprocessor or other processing device for parallel processing.)

If, however, availability status for Channel N did not change (and also following release of the user channel transceiver as specified above), a determination will be made as to whether Channel N equals the last channel to be scanned (77); i.e., in this example, a determination will be made as to whether Channel N equals channel 30. If not, variable Channel N will be incremented by 1 (78) and this new variable will be provided to the channel scanning decision block (72) described above.

If, however, Channel N equals the last channel to be scanned, then the channel status list (30) as newly updated will be transmitted (79) via the common channel transceiver (14) to the telephones (16) as a group for use by these telephones (16) as described below. Following transmission of this data, this subroutine (70) can be repeated with sufficient frequency to assure timely updating of the channel status list (30). (Depending upon the needs of the system, the transmission function could be readily modified to provide for transmission on a less frequent basis. For instance, the system could be readily altered to provide such a transmission only with every fifth review of the channel status list (30). Also, since these transmissions could consume much time, the transmission function could be delegated to a subroutine to be treated as a separate process, or could even be transferred to another microprocessor (not shown) to avoid compromising the regular and frequent review of channel availability.)

The above described functions occur as noted when a channel appears available. If upon reaching this decision block (72), however, the channel in question appears unavailable, the microprocessor (23) then determines whether availability status for the channel in question has changed from the previous analysis (81) (FIG. 5b). If the availability status has not changed, the subroutine (70) moves to the decision block (77) (FIG. 5a) described above for determining whether Channel N equals channel 30.

If the availabilty status for the scanned channel has changed, however, the microprocessor (23) will update the channel status list (30) accordingly (82), and assign an available user channel transceiver (13) to the Channel N frequency (83) to facilitate establishment of a communications link on that channel. Following this, the microprocessor (23) will set a variable "Time T" to zero (84) and then monitor activity on channel N and perform such decoding operations as may be necessary to allow assessment of this activity (86). (The assignment function just mentioned, along with the decoding activities, could again constitute a time consuming process. If the needs of the system render this objectionable, then the assignment, decoding, and other handshake functions as may be required could be delegated to a separate subroutine or to another processing device (not shown) to enable the processing of multiple link requests simultaneously, in accordance with well understood prior art techniques.)

After decoding the activity on channel N, Time T will be incremented by 1 (87) and a decision will be made as to whether any decoded signals received over Channel N equate with any valid ID codes for any of the telephones (16) assigned to this system (88). If the ID code appears valid, the communications link will be completed and a dial tone, as generated by the key service unit tone generator (24), will be provided to the telephone (16) via the selected user channel transceiver (13) (89).

If, however, the decoded signal does not constitute a valid ID code, a determination will be made as to whether Time T exceeds a predetermined constant "X" (91). If not, the subroutine (70) will again repeat the signal decoding process (86), followed by another increment in the time variable (87). If time has been exceeded (91), the user channel transceiver (13) as previously assigned to the channel in question (83) will be released (92) and the subroutine (70) will return to the decision block described above that determines whether Channel N comprises the last channel to be scanned (77) (FIG. 5a).

The frequency with which the user channels are scanned and the scanning data processed as described above can of course be established by the user. Nevertheless, the frequency with which the channels are scanned and processed should be often enough to ensure that an attempted link as initiated by a telephone (16) will not be accompanied by undue delays between initiation of the attempted link and receipt of a dial tone.

Figure 6A:
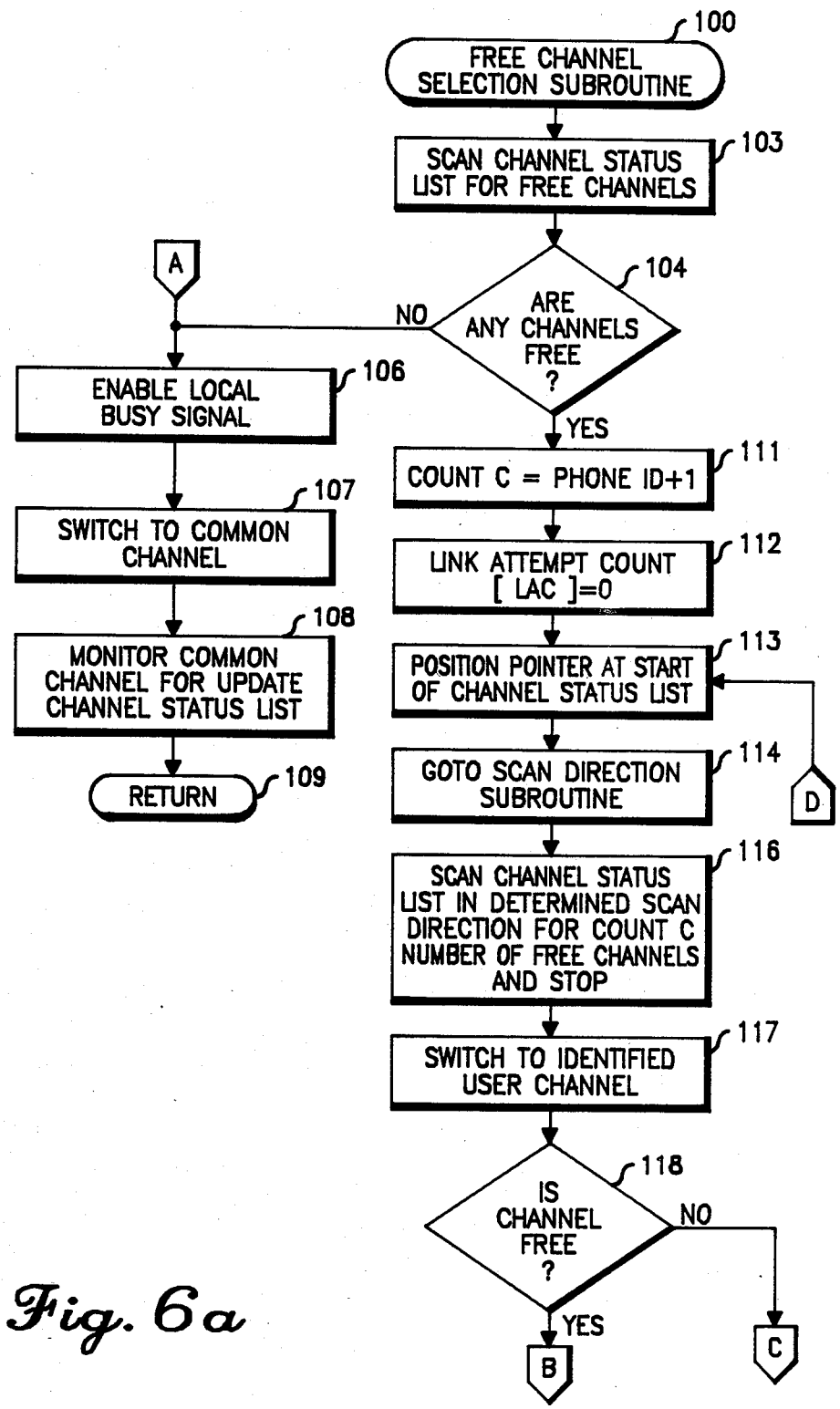
FIGS. 6a and 6b comprise a flow chart depicting the free channel selection subroutine as utilized by the telephones.
Figure 6B:
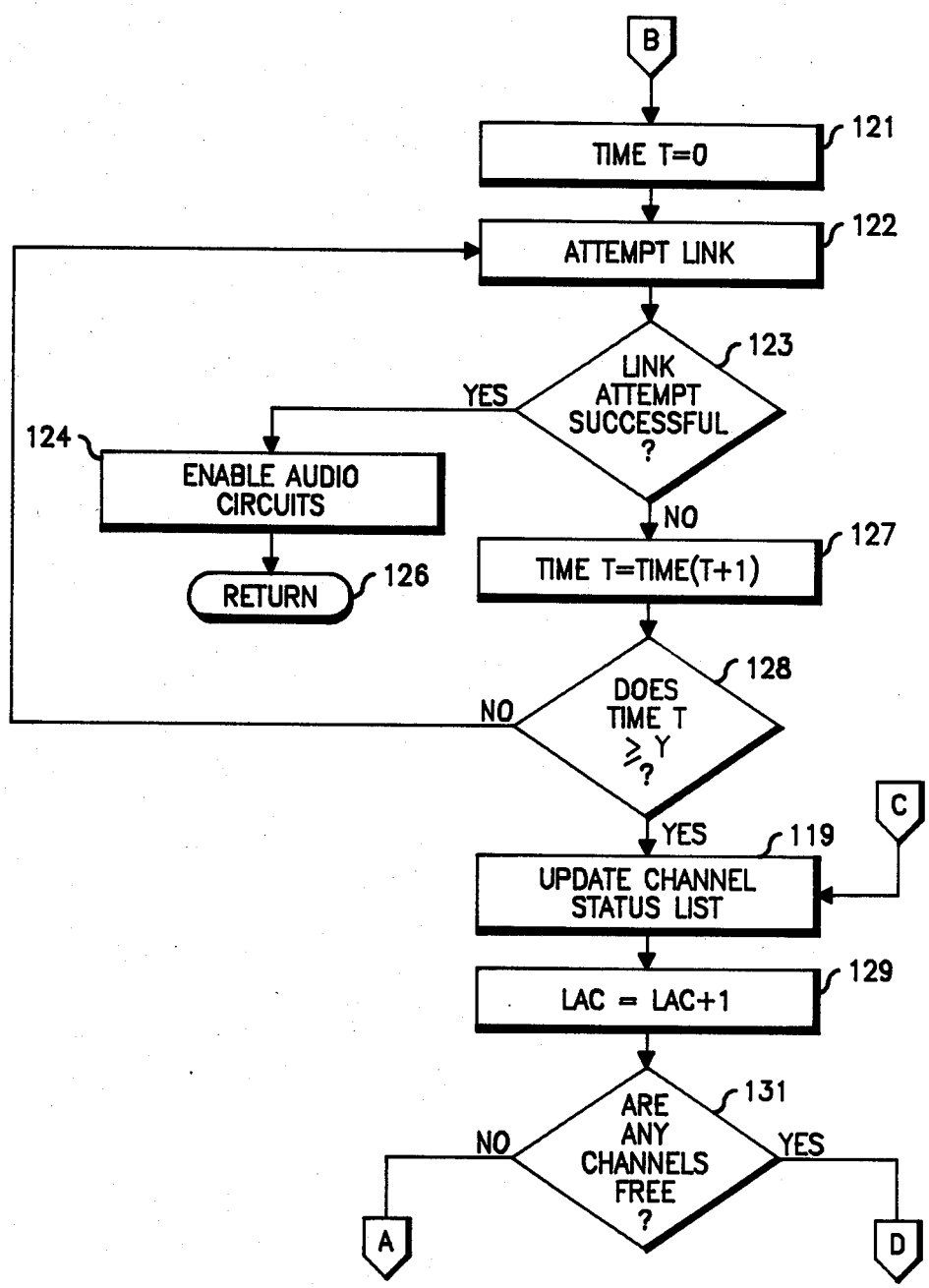

Referring now to FIGS. 6a and 6b, a flow chart depiction of a free channel selection subroutine (100) suitable for use by the telephone microprocessors (51) will be described.

This subroutine (100) presumes receipt and storage by the telephone (16) of the channel status list (30) as created and forwarded by the key service unit (11) as described above pursuant to the KSU channel status list subroutine (70). This subroutine (100) also presumes that each telephone (16) has an identification number (110) and that the key service unit also has an identification number.

Figure 4:
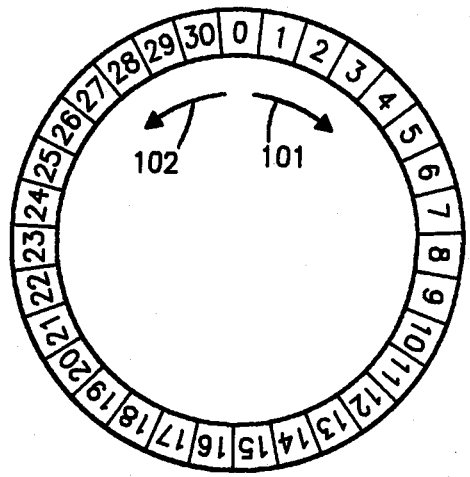
FIG. 4 comprises a diagrammatic representation of the channel status list memory ring.

Finally, it should be noted that the channel status list (30) can be stored in a memory (53) in such a way as to allow access based on a ring like structure as depicted in FIG. 4. Pursuant to this configuration, scanning in a first direction (101) will allow scanning of the channels in a sequentially increasing manner until channel 30 has been reached, following which channel zero will occur. These channels can also be scanned in an opposite direction (102) to allow the channels to be scanned in descending order until a transition is made from channel zero to channel 30, whereupon the scanning process would be repeated. Implementation of such a ring like memory structure can be readily realized by those skilled in the art through appropriate use of pointers and the like.

With reference to FIG. 6a, the subroutine (100) begins by scanning the channel status list (30) (103) to determine whether any channels appear to be currently available (104). If no channels appear to be available, a busy signal will be locally generated (106) (for instance, by the microprocessor (51) in accordance with well understood prior art technique) and the RF demodulation unit (56) will be switched in frequency to the common channel (107) to allow the telephone (16) in question to monitor the common channel for an updated channel status list (30) (108). Upon receiving an updated list, the subroutine (100) can return (109) and again scan the channel status list (30) for available channels (103) as described above.

Presuming that the channel status list (30) includes at least one available channel, a variable "Count C" will be set to equal the telephone ID number (110) plus one (111). (A "one" is added to the ID number to provide for a possible ID number of "zero"; if "zero" were not used as an identification number for any of the telephones in a particular system, then the addition of this constant could be dispensed with.) Following this, a variable "LAC" (link attempt count) will be initialized to zero (112).

The subroutine (100) next positions a "pointer" at the beginning of the channel status list (30) (113). In other words, in the context of the memory ring structure described above with respect to FIG. 4, a memory address register "points" to channel zero. Next, the subroutine (100) executes a scan direction subroutine (114) that will be described below in more detail. Pursuant to execution of the scan direction subroutine (114), the free channel selection subroutine (100) will scan the channel status list (30) in the determined direction (either "clockwise" (101) or "counterclockwise" (102)). While scanning in the specified direction, the available channels will be counted. The scanning and counting will stop when the count of available channels equals the variable "Count C" (116). The channel at which the scan stops constitutes the selected channel (117).

Having selected a channel from the channel status list (30), the telephone (16) will now independently determine if the selected channel is actually available (118). To accomplish this, the telephone RF demodulation unit (56) monitors the selected channel for energy. If energy can be sensed on this channel, this channel will not be used, and the channel status list (30) maintained in that telephone (16) will be updated (119) (see FIG. 6b) to indicate non-availability of this channel.

Otherwise, presuming availability of the selected channel, a variable "Time T" will be initialized to zero (121) and a communications link will be attempted on that user channel (122). A determination will then be made as to the success of the link attempt (123), such as by exchanging handshake protocols with the key service unit. If successful, the audio circuits for the telephone (16) will be enabled (124) and the subroutine (100) may be directed (126) to other appropriate functions as desired.

If the link attempt is initially unsuccessful, variable "Time T" will be incremented by one (127) and a decision will be made as to whether Time T exceeds a constant "Y" (128). If "Y" has not been exceeded, the link will again be attempted (122). Otherwise, the channel status list (30) for that telephone (16) will be updated to identify the selected channel as being currently non-available (119), following which the variable LAC will be incremented by one (129).

A determination will be made as to whether any available channels remain on the channel status list (30) (131). If at least one channel remains, the scan procedure will be reinitiated (113). If no channels remain, the subroutine (100) will switch to the common channel (107) and await an updated channel status list (30) (108) from the key service unit (11).

Figure 7:
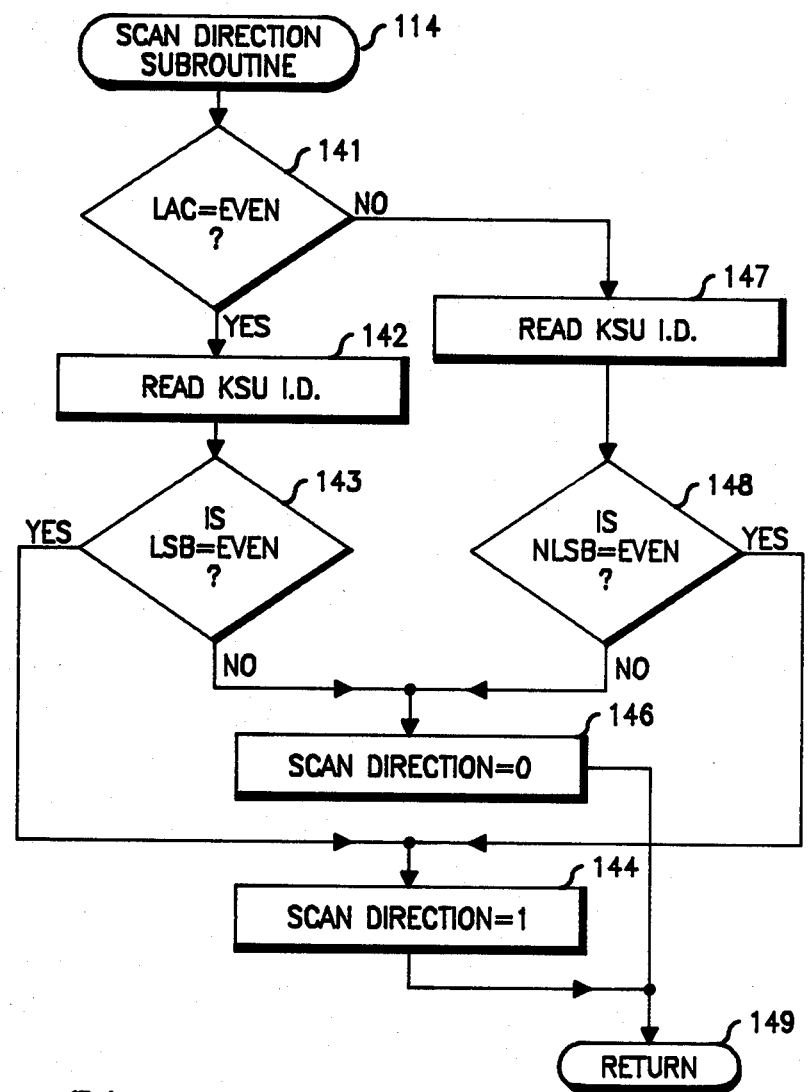
FIG. 7 comprises a flow chart of a scan direction subroutine as utilized by the free channel selection subroutine.

Referring now to FIG. 7, the scan direction subroutine (114) as referred to above will be described.

Initially, this subroutine (114) determines whether the variable LAC constitutes an even number (141). If it does, then the subroutine (114) will cause the microprocessor (51) to read the key service unit identification number (142) and then determine if the least significant bit of this identification number constitutes an even number (143). If it does, then a scan direction flag will be set to one (144) (this scan direction flag can be used by the free channel selection subroutine (100) to determine whether to scan the channel status list (30) in a "clockwise" direction or a "counterclockwise" direction). If the least significant bit comprises an odd number, then the scan direction flag will be set to zero (146).

On the other hand, if the variable LAC constitutes an odd number, the key service unit identification number will again be read (147), following which a decision will be made as to whether the next to least significant bit of the key service unit identification number constitutes an even number (148). If even, the scan direction flag will be set to one (144). If odd, the scan direction will be set to zero (146).

Following setting of the scan direction flag, the subroutine (114) will return (149) to the free channel selection subroutine (100) described above with respect to FIGS. 6a and b.

Pursuant to the scan direction subroutine (114), the direction in which the channel status list (30) is scanned will depend upon both the number of link attempts that have been made and also the key service unit identification number. Therefore, uniqueness of the selected channel will be favored as between competing telephones within a given system, and also as between telephones of competing systems.

Through provision of the above described system, at least three features contribute significantly to the overall successful strategy of the system. First, the key service unit (11) employs only as many user channel transceivers (13) as there are telephones (16), and then supplements this with one common channel transceiver (14) and one channel scanning receiver (15). Second, a channel status list (30) as accumulated by the key service unit (11) is regularly transmitted to the individual telephones (16), such that this list can be utilized by the telephones. Third, the telephones (16) use this channel status list (30) in a way that encourages selection of a unique, available channel at an early moment in the channel selection procedure, thereby avoiding delay in providing a dial tone to the user of the telephone (16). By virtue of the above attributes, neither the key service unit (11) or the telephones (16) make exclusive decisions regarding which channel to use. Instead, although the telephones (16) always initialize the link, the telephones have access to information regarding those channels that appear available to the key service unit (11), while retaining a unique capability to act upon and update this information with conclusions of their own. In short, the telephones do not make exclusive decisions regarding the channel to be used.

Those skilled in the art will recognize that many modifications and variations could be implemented with respect to the above described embodiment. For instance, this system could support more telephones in a given application than there are channels, provided that occasional blocking is acceptable to the users. As another example, the channel status list could be scanned by the telephone in other than sequential order, if so desired. As yet another example, the key service unit could provide a subset listing of the channel status list to each telephone, with each telephone receiving a different subset, or each telephone receiving a subset having differently sequenced channels. The telephones could still select channels from these subsets in accordance with the above description, but in a given application early acquisition of a free channel may more likely result. Therefore, the following claims should not be viewed as being limited to the embodiment set forth unless such claims include specific limitations directed to particular features.

I claim:

1. In a multi-channel telephone system having:
   (A) a plurality of telephones, each of said telephones having a transceiver unit;
   (B) a plurality of user channels; and
   (C) a key service unit having a plurality of user channel transceivers for interfacing between said plurality of telephones and a primary communications link via said user channels;
an improvement comprising:
   (A) channel monitor means for frequently monitoring said plurality of user channels for energy, for determining availability of said user channels based upon such monitoring, and for providing an output related to the availabilty of said user channels; and
   (B) channel status list means for receiving said output from said channel monitor means and for maintaining a list relating to availabilty of said user channels.

2. The improvement of claim 1 wherein each of said user channels comprise radio frequency links having preselected discrete frequencies.

3. The improvement of claim 1 wherein there is one user channel transceiver for each one of said telephones.

4. The system of claim 3 wherein said channel monitor means is incapable of transmitting information over said user channels.

5. The improvement of claim 1 wherein there is one user channel transceiver per supported user channel.

6. The system of claim 5 wherein said channel monitor means is incapable of transmitting information over said user channels.

7. The system of claim 1 wherein there are more of said user channels than there are of said telephones, and wherein said user channel transceivers are assigned by said key service unit to interface on a selected user channel on an as needed basis.

8. The improvement of claim 7 wherein there is provided one of said user channel transceivers for each one of said telephones.

9. The improvement of claim 8 wherein said channel monitor means is incapable of transmitting information over said user channels.

10. The improvement of claim 7 wherein there is one user channel transceiver per supported user channel.

11. The system of claim 10 wherein said channel monitor means is incapable of transmitting information over said user channels.

12. The improvement of claim 1 wherein said channel monitor means includes a receiver unit which can receive information over said user channels but which cannot transmit information over said user channels.

13. The improvement of claim 12 wherein there is provided one of said user channel transceivers for each one of said telephones.

14. The improvement of claim 12 wherein there is one user channel transceiver per supported user channel.

15. In a multi-channel telephone system having:
   (A) a plurality of telephones, each of said telephones having a transceiver unit;
   (B) a plurality of user channels; and
   (C) a key service unit having a plurality of user channel transceivers for interfacing between said plurality of telephones and a primary communications link via said user channels;
an improvement comprising:
   (A) channel monitor means for determining availabilty of said user channels for use in interfacing between said plurality of telephones and said primary communications link; and
   (B) common channel transceiver means for occasionally transmitting information regarding availability of said user channels to said plurality of telephones.

16. The improvement of claim 15 wherein said user channels comprise radio frequency links having discrete preselected frequencies.

17. The improvement of claim 15 and further including channel status list means for receiving information from said channel monitor means regarding availability of said user channels and for providing said information to said common channel transceiver means for said transmission to said plurality of telephones.

18. The improvement of claim 17 wherein said channel status list means maintains a list relating to availability of said user channels, such that said list comprises said information that is provided to said common channel transceiver means and that is transmitted to said plurality of telephones.

19. The improvement of claim 15 wherein said telephones each include memory means for retaining said information regarding availability of said user channels.

20. The improvement of claim 19 wherein said telephones further each include means for allowing said information retained in said memory means to be updated by said telephone in response to a determination of channel availability as made by said telephone.

21. In a multi-channel telephone system having:
   (A) a plurality of telephones, each of said telephones having a transceiver unit;
   (B) a plurality of user channels; and
   (C) a key service unit having a plurality of user channel transceivers for interfacing between said plurality of telephones and a primary communications link via said user channels;
an improvement comprising:
   (A) means for providing said telephones with a channel status list comprising a list of user channels that appear to be available for use in interfacing said telephones with said primary communications link;
   (B) means for providing each of said telephones in said system with an identification number unique to each telephone within said system; and
   (C) providing communications link establishment means for selecting a user channel from said channel status list to be used for attempting to establish an interface between one of said telephones and said primary communication link, said communications link establishment means operating to initially select one of said user channels based, at least in part, upon the identification number for that telephone.

22. The improvement of claim 21 and further including channel monitor means for frequently monitoring said plurality of user channels for energy, for determining availability of said user channels based upon such monitoring, and for providing an output related to the availability of said user channels.

23. The improvement of claim 22 and further including common channel transceiver means for occassionally transmitting information based upon said output regarding availability of said user channels to said plurality of telephones.

24. The improvement of claim 23 wherein each of said telephones each further include channel status list update means for updating said channel status list when an attempted user channel link proves to be unsuccessful.

25. The improvement of claim 21 wherein said communications link establishment means selects one of said user channels from said channel status list by sequentially addressing said channel status list an amount related to a count that is derived, at least in part, from the identification number for that telephone.

26. The improvement of claim 25 wherein said count is derived by summing at least a portion of said identification number with a non-zero constant.

27. The improvement of claim 21 wherein said telephones each further include channel status list update means for updating said channel status list when an attempted user channel link proves to be unsuccessful.

28. The improvement of claim 21 wherein said channel status list is maintained by each of said telephones in a ring-like closed-loop memory structure.

29. The improvement of claim 28 wherein said channel status list can be selectively sequentially addressed in a continuous first direction and in a continuous second direction.

30. The improvement of claim 29 and further including sequence direction determination means for selecting said direction of sequential addressing.

31. The improvement of claim 30 wherein said key service unit has an identifcation number, and wherein said sequence direction determination means determines said direction of sequential addressing as based, at least in part, on said key service unit identification number.

32. The improvement of claim 30 wherein said sequence direction determination means determines said direction of sequential addressing as based, at least in part, on how many unsuccessful attempts have already been made to establish a communications link without successfully establishing such a link.

33. The improvement of claim 32 wherein said key service unit has an identification number, and wherein said sequence direction determination means determines said direction of sequential addressing as based, at least in part, on said key service unit identification number.

34. In a multi-channel telephone system having:
(A) a plurality of user channels, at least some of said user channels comprising radio frequency links having preselected frequencies;
(B) a plurality of telephones, each of said telephones having a transceiver unit capable of transmitting and receiving information over at least one of said user channels; and
(C) a key service unit having a plurality of user channel transceivers capable of transmitting and receiving information over at least one of said user channels for interfacing between at least one of said plurality of telephones and a primary communications link via one of said user channels;
an improvement comprising:
(A) channel monitor means incapable of transmitting information over said user channels for frequently monitoring said plurality of user channels for energy, for determining availability of said user channels based upon such monitoring, and for providing an output related to the availabilty of said user channels; and
(B) channel status list means for receiving said output from said channel monitor means and for maintaining a list relating to availabilty of said user channels.

35. The improvement of claim 34 and further including common channel transceiver means for occassionally transmitting said list to said plurality of telephones.

36. The improvement of claim 35 wherein said telephones each include memory means for retaining said list.

37. The improvement of claim 36 and further including:
(A) means for providing each of said telephones in said system with an identification number unique to each telephone within said system; and
(B) communications link establishment means for selecting a user channel from said list to be used for attempting to establish an interface between one of said telephones and said primary communication link, said communications link establishment means operating to initially select one of said user channels based, at least in part, upon the identification number for that telephone.

38. The improvement of claim 37 wherein said communications link establishment means selects one of said user channels from said list by sequentially addressing said channel status list an amount related to a number that is derived, at least in part, upon the identification number for that telephone.

39. The improvement of claim 38 wherein said list can be selectively sequentially addressed in a continuous first direction and in a continuous second direction.

40. The improvement of claim 39 and further including sequence direction determination means for selecting said direction of sequential addressing.

41. The improvement of claim 40 wherein said key service unit has an identifcation number, and wherein said sequence direction determination means determines said direction of sequential addressing as based, at least in part, on said key service unit identification number.

42. The improvement of claim 41 wherein said sequence direction determination means determines said direction of sequential addressing as based, at least in part, on how many unsuccessful attempts have already been made to establish a communications link without successfully establishing such a link.

43. The improvement of claim 42 wherein each of said telephones each further include channel status list update means for updating said list when an attempted user channel link proves to be unsuccessful.

* * * * *